Figure 1:
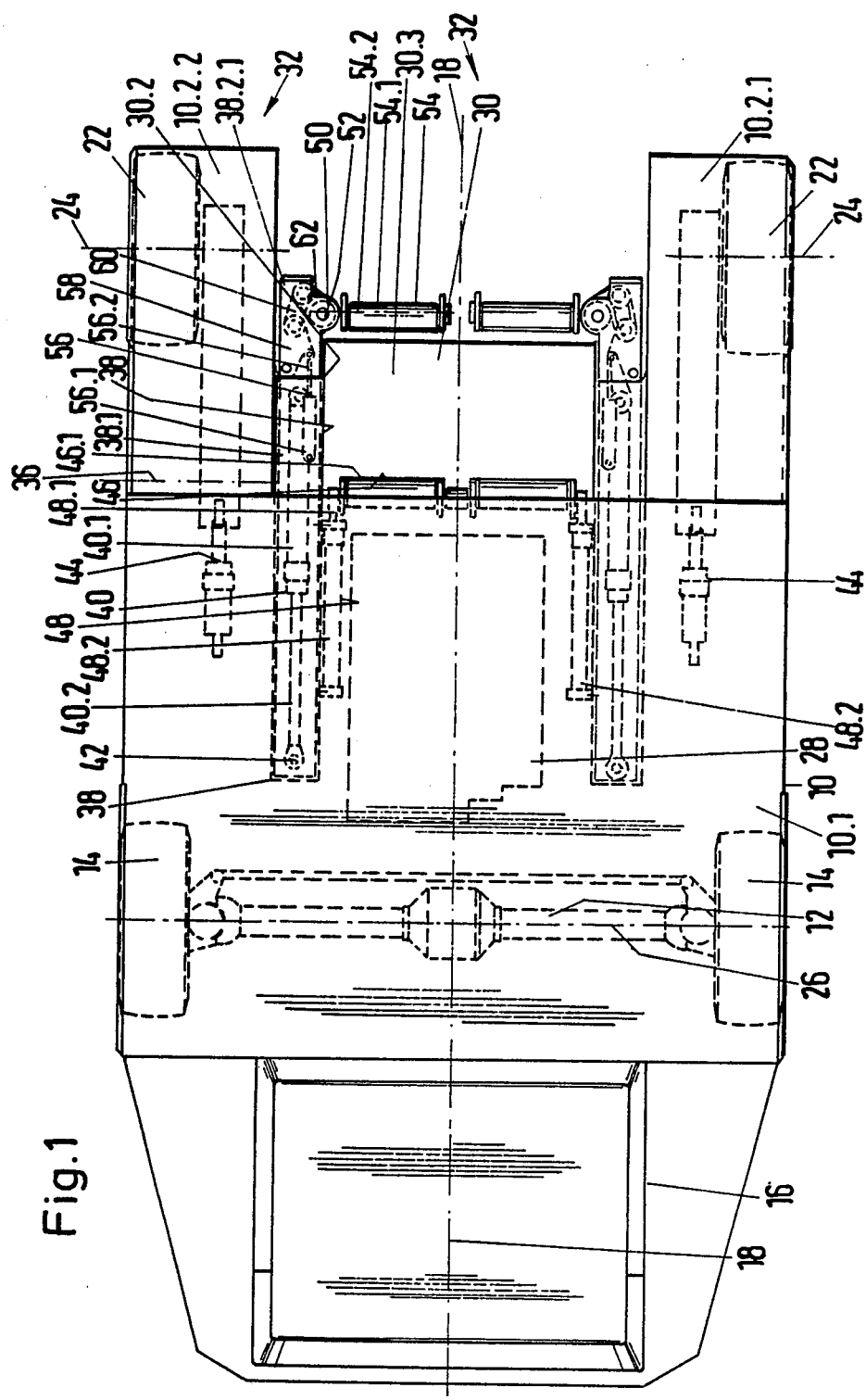

United States Patent [19]

Schopf

[11] Patent Number: 4,810,157

[45] Date of Patent: Mar. 7, 1989

[54] TRACTOR FOR MANEUVERING AN AIRPLANE WITHOUT A TOW BAR

[75] Inventor: Jörg Schopf, Stuttgart-Heumaden, Fed. Rep. of Germany

[73] Assignee: MAN Gutehoffnungshütte GmbH, Fed. Rep. of Germany

[21] Appl. No.: 163,820

[22] PCT Filed: May 14, 1987

[86] PCT No.: PCT/EP87/00251

§ 371 Date: Mar. 7, 1988

§ 102(e) Date: Mar. 7, 1988

[87] PCT Pub. No.: WO87/06910

PCT Pub. Date: Nov. 19, 1987

[30] Foreign Application Priority Data

May 17, 1986 [DE] Fed. Rep. of Germany ....... 3616807

[51] Int. Cl.$^4$ ............................................. B64F 1/22
[52] U.S. Cl. .................................................... 414/429
[58] Field of Search .............................. 414/426–430, 414/474, 491; 180/904

[56] References Cited

U.S. PATENT DOCUMENTS

| | | | |
|---|---|---|---|
| 3,119,502 | 1/1964 | Paul | 414/427 X |
| 4,122,963 | 10/1978 | Berglund et al. | 414/474 X |
| 4,375,244 | 3/1983 | Morin | 414/429 X |
| 4,632,625 | 12/1986 | Schuller et al. | 414/429 |
| 4,658,924 | 4/1987 | Dobbie | 414/426 X |

FOREIGN PATENT DOCUMENTS

| | | | |
|---|---|---|---|
| 1063967 | 8/1959 | Fed. Rep. of Germany | 414/428 |
| 3318077 | 11/1984 | Fed. Rep. of Germany | . |
| 3327629 | 2/1985 | Fed. Rep. of Germany | . |
| 2454409 | 4/1979 | France | . |
| 1334800 | 10/1973 | United Kingdom | . |

Primary Examiner—Duane A. Reger
Assistant Examiner—Patrick N. Burkhart
Attorney, Agent, or Firm—Wigman & Cohen

[57] ABSTRACT

In the use of a tractor to maneuver an airplane on its nose landing gear, which tractor includes a chassis (10); having a rear access (32) which receives said nose wheels and having two telescoping bars (38) the length of which can be adjusted by means of first hydraulic cylinders (40) and to the rear ends of which (38.2.1) pivotable pulling arms (54) are hingedly connected for engagement behind the nose wheels; and having a support surface (30.3) for the raising of the nose landing gear, which is performed by means of second hydraulic cylinders (44), in order to cause less wear on the nose wheels during loading and raising and to prevent damage to the tractor and/or nose landing gear in the attempt to pull said nose landing gear into the recess by means of the pulling arms, it is suggested:

(a) to form the chassis in two parts and to hingedly connect its front portion (10.1) with its rear portion (10.2) at a folding axis (36) and by means of the second aggregates (44) above this axis;

(b) to arrange the immovable portions (38.1) of the telescoping bars and the cylinders (40.1) of the first aggregates (40) on the front portion of the chassis;

(c) to form the support surface on an elevating shovel (30) at the level of the folding axis, which elevating shovel extends from the front portion of the chassis behind this axis into the downwardly open chassis recess behind the shovel and between the rear wheels (22); and (d) to provide a holder (46) axially opposite the laterally positioned pulling arms and above the elevating shovel, which holder can be moved approximately parallel to the longitudinal axis (18) at the same time as the pulling arms by means of third hydraulic cylinders (48).

8 Claims, 3 Drawing Sheets

TRACTOR FOR MANEUVERING AN AIRPLANE WITHOUT A TOW BAR

The invention relates to a tractor for maneuvering an airplane without a tow bar, having: a chassis which includes a rearwardly, upwardly and downwardly open recess, a rear portion that is forked due to the recess and has a pair of coaxially mounted, powered rear wheels, and a front portion having two steerable and perhaps powered front wheels; a pair of approximately horizontal cylinders of a first hydraulic cylinder piston aggregate that are arranged parallel to each other on the chassis and are for adjusting the length of two telescoping bars which are adjustable parallel to the respective side walls of the recess and are each provided at their free rear ends with a hinged pulling arm, which can pivot through a right angle between a relatively open position relative to the free end of the bar parallel to the axis of the tow bar and a relatively closed blocking position perpendicular to the axis of the tractor about a vertical axis which perpendicularly intersects the associated tow bar axis; a support surface which is arranged on the chassis at the front end of a recess and is inclined downward toward the rear and underneath to allow for the elevation of the nose landing gear when the pulling arms and shortened telescoping bars are in their blocking positions; and an elevating device including a pair of second hydraulic cylinder-piston aggregates arranged on the chassis for lifting the nose landing gear after it has been placed adjacent to and on the support surface and locked in place there by means of the pulling arms moving into their blocking positions.

In a tractor known from U.S. Pat. No. 4,225,279 (Origin: FR No. 2,452,427) having the same purpose, a downwardly closed chassis recess is provided which is open upward and to the rear and which receives the nose landing gear of the airplane to be maneuvered without a tow bar in a pocket-like depression, after a flap hinged to the tractor chassis behind the pocket has pivoted down to the tarmac at an angle like a ramp and the nose landing gear has passed forward up this ramp into the pocket. To accomplish this, the tractor must back up, allowing the rear edge of the ramp to be pushed between the unbraked wheels of the nose landing gear and the tarmac, which entails high impact forces which can be damaging to the nose landing gear, particularly the wheels, and to the tarmac. As the nose landing gear passes relatively up and forward over the ramp into the pocket, the weight of the nose of the airplane produces an increasing torque relative to the rear axle of the tractor, which tends to lift the front of the tractor. It is therefore necessary to arrange the motor of the tractor as far forward on the chassis as possible and/or to provide ballast there, so that the front wheels of the tractor do not rise from the tarmac when the nose landing gear is loaded onto the tractor. Furthermore, it is difficult to control this loading process.

Therefore, to avoid these disadvantages, certain suitable tractors of the above-described type have been proposed, known from DE-OS No. 33 18 077, in which (see OS FIGS. 2 and 3) the chassis recess is defined by an at least U-shaped horizontal frame that is temporarily rectangular, can be raised and lowered by means of the elevating device, houses a brake shoe-like support body including the support surface in its forward portion, and the sides of which are formed by the two telescoping bars and the rear of which is formed, when it is formed, by the two pulling arms in their blocking positions, where they are rigidly connected with each other, and in which the brake shoe-like support bodies include respective support surfaces that slope downward toward the front and underneath. To load the nose landing gear into the rearwardly open chassis recess of this tractor, the tractor travels backwards until its front support body contacts the nose wheels of the perhaps braked, but in any event stationary, airplane, whereupon the two pulling arms of the tractor are folded into their horizontal positions and are locked together, thereby closing the loading frame in its rectangular shape.

The telescoping bars of the unbraked, stationary tractor can then be shortened, whereby the pulling arms are brought into contact with the nose wheels and the tractor effectively draws itself backward until its front support body contacts the nose wheels, whereupon the three support bodies draw the nose gear upward when the elevating device is activated. As a result, the portions of the nose wheels located between the front support body on one side and the two rear support bodies on the other side are pressed through under the load (about 20 t.) of the nose of the airplane and are squeezed front and rear, which after many repetitions can lead to tire damage on the nose landing gear, which may also result by different means with the known tractor having a ramp and pocket.

While with the known tractor having a ramp and pocket there can be difficulties in communication between the tractor driver and the airplane pilot relative to activating the nose gear brakes of the airplane before the tractor approaches, which result in the danger of unintentional movements of the airplane or damage to the nose landing gear and/or the tractor, such difficulties do not exist with the known tractor of the above-described type, at least when such a tractor approaches a braked airplane which, however, can also be unbraked.

The object of the invention is to create a tractor for maneuvering an airplane with its nose landing gear which avoids the cited disadvantages of the two known tractors, and which does not unduly cause damage to the nose wheel tires of the airplane as the nose landing gear is being loaded by the tractor and raised and which reliably prevents damage thereto and to itself caused by delayed pressurization of the landing gear brakes of the airplane.

This object is achieved according to the invention with a tractor of the above-described type, in that: the front and rear portions of the chassis are separate and are hingedly connected with each other by means of a single jointed axle running parallel to the rear axle; the approximately horizontal second aggregates arranged parallel to the tractor axis are each connected on one end to the front portion of the chassis and on the other end to the rear portion thereof; the cylinders of the first aggregates and the immovable portions of the telescoping bars are mounted on the front portion of the chassis and an elevating shovel which includes the support surface is attached to this front portion behind the jointed axle; and a pair of approximately horizontal cylinders of third cylinder-piston aggregates are provided parallel to the front portion of the chassis, the piston rods of which third aggregate are arranged on one of the respective sides of the recess in the chassis and are provided at their rear free ends with at least one hinged holder disposed perpendicularly to the tractor axis, which holder continuously projects into the recess in the chassis.

In this manner it is advantageously achieved that the nose wheel tires of the airplane are not subjected to an unusual deformation either when they are taken hold of or when they are raised, because the elevating shovel creates a replacement floor corresponding to the tarmac onto which the nose wheel tires can be rolled naturally; and due to the braked condition of the tractor and the pulling of the airplane, the airplane brakes can be released from the beginning (and indeed must be), thus obviating any necessity for communication between the pilot and the driver.

In one preferred embodiment of the tractor according to the invention, the jointed axle for hingedly connecting the front and rear portions of the chassis are arranged approximately at the level of the support surface of the elevating shovel at the front end thereof and the second aggregates engage the rear portion of the chassis approximately over the jointed axle. This achieves a maximum elevating torque.

In the preferred embodiment the telescoping bars of the first aggregates that adjust them are inclined to fall toward the rear from the horizontal, so that the pulling arms also do not press the smaller wheels of the nose landing gear of a smaller airplane down onto the tarmac, which would make it more difficult to load the nose wheels onto the elevating shovel.

In the preferred embodiment the cylinders of the first aggregates and the immovable portions of the telescoping bars are arranged adjacent to one another in such a manner that each cylinder and a fixed rear portion of the telescoping bars are arranged at approximately diametrically opposite points relative to the tractor axis in the recess of the chassis, and engage the one-sided piston rods projecting from the associated cylinders at the front ends of the movable front portions of the telescoping bars. In this manner, with constant pressure from the hydraulic medium, a greater pulling force is achieved than with a reversed arrangement of the first aggregates relative to the telescoping bars, because of the full utilization of the piston surface. In the preferred embodiment, respective truncated shafts serving to mount the pulling arms are provided on the free ends of the movable end portions of the telescoping bars so as to rotate therewith. These truncated shafts extend along the pivot axis of the respective pulling arm associated therewith and are rotatably mounted on the end of the associated telescoping bar. Respective pivot arms connected with their associated truncated shafts and a cylinder of a fourth hydraulic cylinder-piston aggregate mounted on the associated movable portions of the telescoping bars are also provided for pivoting the pulling arms. The piston rods projecting rearwardly from these cylinders are hingedly connected with the ends of the associated pivot arms opposite the truncated shafts. This makes possible a simple, remotely controllable pivoting of the pulling arms.

In the preferred embodiment, the fourth aggregates are arranged approximately parallel on the movable end portion of the associated telescoping bar, and the front end of each cylinder thereof is hinged at that point and the piston rod thereof is hinged to a one-armed lever which is pivotably mounted to the end portion of the telescoping bar at a point lying closer to the pivot axle of the lever. Furthermore, one end of a rigid coupling member is hinged to the other end of the lever at a point lying farther from its pivot axle, and the other end thereof is hingedly connected to the free end of the associated pivot arm, whereby all hinge axles are parallel to each other and are approximately perpendicular to the pivot axles of the associated pulling arms. As a result, the knee lever consisting of the one-armed lever and the coupling member, when it is extended, transfers the compression force to the telescoping bar, so that the fourth aggregate must only maintain their extension and do not need to be separately loaded.

In the preferred embodiment, the pulling arms and/or holders are each formed as roller blocks which are mounted so as to freely rotate on the associated truncated shaft, i.e., on the free rear end of the piston rod of the associated third aggregate about an axle that is sometimes or always horizontal. In this manner the linear contact of a single roller with the nose landing gear of the airplane to be towed, which is engaged behind by a pulling arm and held down by a holder is replaced by a multiple-lined, i.e., quasi surface-like contact between the roller block and the nose wheel, so that the engagement and holding down also takes place reliably and with reduced wear on the tires even with nose wheel diameters that differ from airplane to airplane. Instead of the roller blocks, however, individual rollers can also be used, although care must be taken to assure that the requisite rolling friction is present between the nose wheels of the airplane to be towed, on the one hand, and the pulling arms and holders of the tractor on the other hand.

In the preferred embodiment, the holders are formed as holding arms and are partially rigidly connected with each other perpendicular to the tractor axis, so that both nose wheels of the nose landing gear experience a uniform contact over the entire width of the elevating shovel, except the center thereof in the case of roller blocks formed as holding arms, which render a centering of the moving nose landing gear on the longitudinal axis of the stationary tractor superfluous.

Figure 1A:
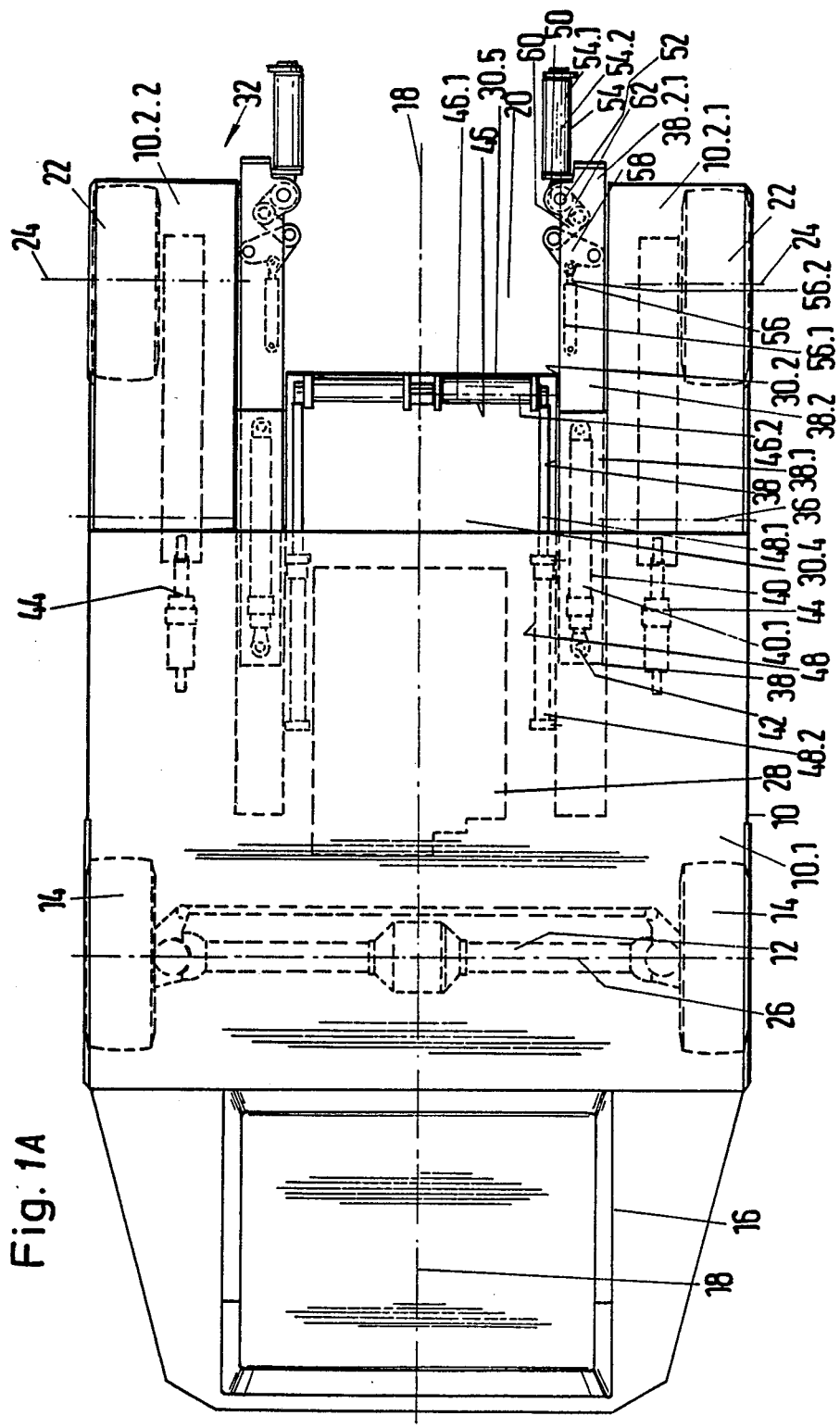
Figure 2:
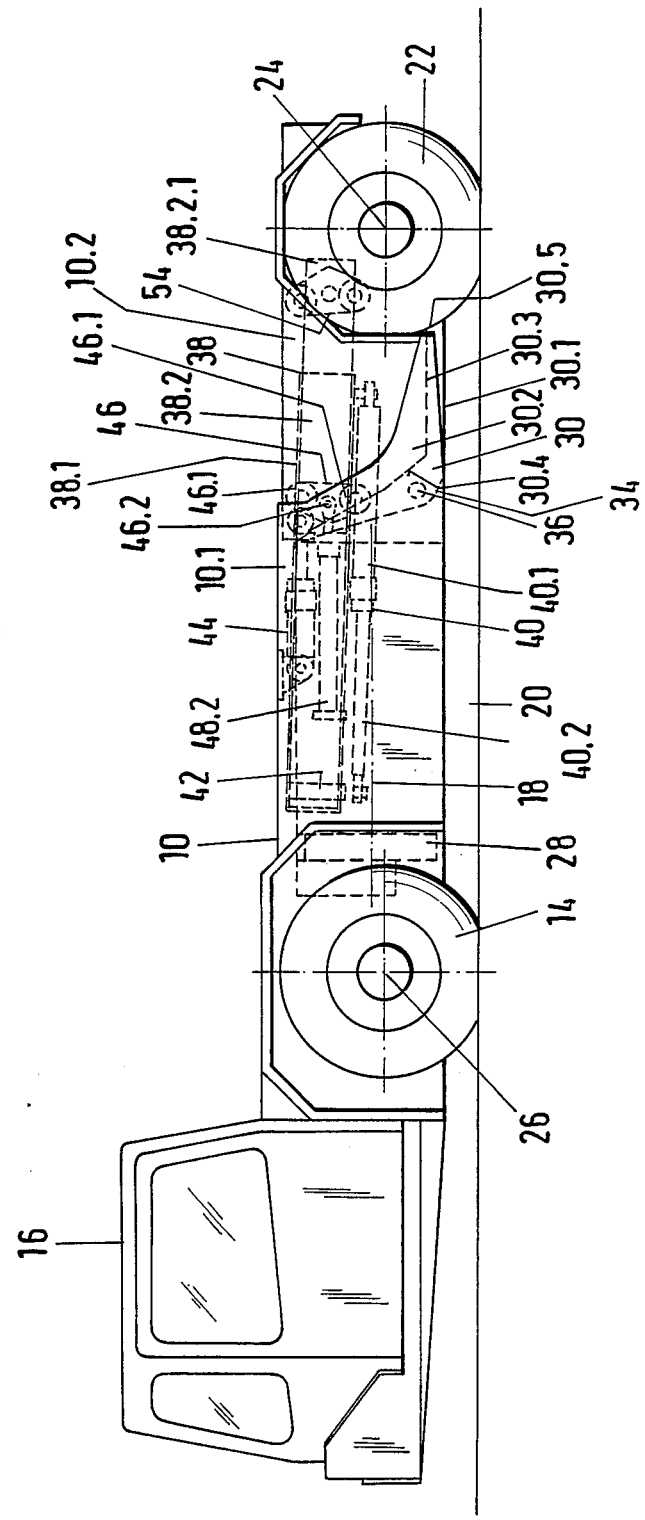
Figure 3:
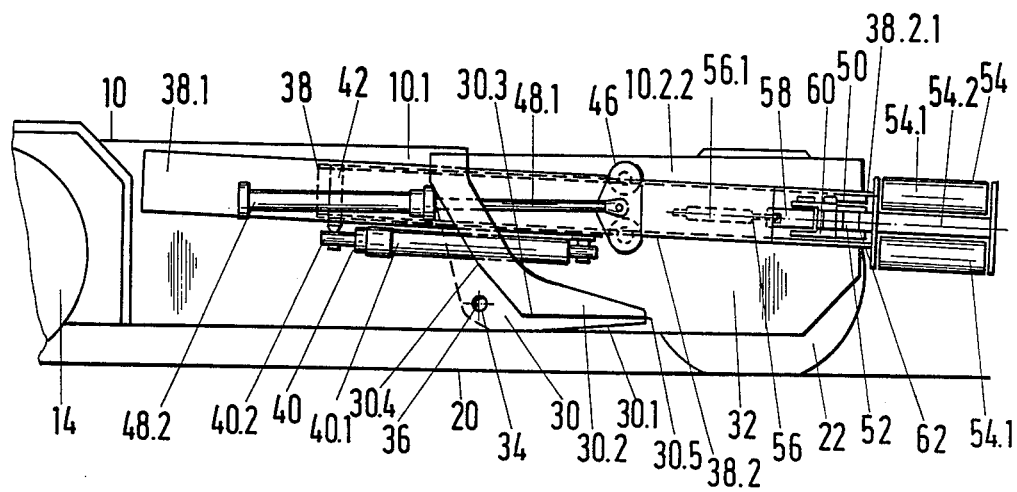
Figure 4:
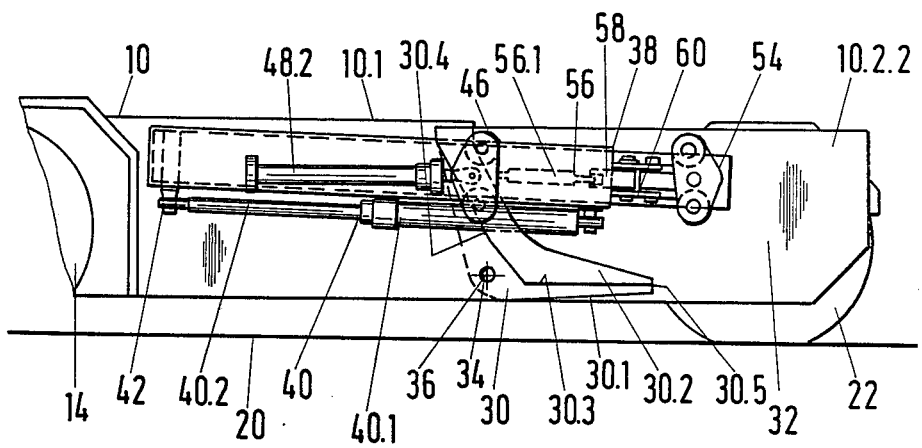

The invention is described in greater detail below with the aid of the preferred embodiment of the tractor according to the invention, examples of which are illustrated in the drawings. Shown are:

FIGS. 1 and 1A top views of the embodiment, whereby the upper and lower halves show the condition before and after the loading of the airplane nose wheels;

FIG. 2 a side view of the embodiment with the imaginary wheel loading, corresponding to the upper half of FIG. 1; and FIGS. 3 and 4 corresponding longitudinal sections, broken off at the front end, through the embodiment as side views of the upper half in FIG. 1 before and after the imaginary wheel loading.

The tractor according to the invention includes an essentially two-piece chassis (10), on the larger, unified front portion (10.1) of which, approximately in its center, there is mounted a drivable front axle (12) having two steerable front wheels (14) and on which a cabin (16) for the tractor driver is placed in front of the front axle. The rear portion (10.2) of the chassis consists of a left half (10.2.1) and a right half (10.2.2), which are formed as mirror images of each other relative to a vertical symmetry plane containing the longitudinal axis (18) of the tractor (10), which plane is perpendicular to a smooth, imaginary travel surface (20) for the tractor, but are otherwise formed identically. Each half of the rear portion of the chassis (10.2) includes a drivable rear wheel (22) which turns with the opposite second rear wheel about the same imaginary lateral axis (24), which lies perpendicular to the vertical plane of symmetry containing the longitudinal axis (18), which is also true for the longitudinal axis (26) of the sections of the front axle (12) mounted on the front portion (10.1) of the chassis. An internal combustion engine (28) is provided behind the front axis (26) centered in the front portion (10.1), and all wheels (14 and 22) are hydrostatically driven.

At its rear end behind the engine (28), the front portion (10.1) of the chassis has an elevating shovel (30) with a smooth lower support surface (30.1) which rises slightly toward the rear, the full surface of which comes into contact with the tarmac (20) when the front portion (10.1) of the chassis rotates about the front axis (26). The elevating shovel (30), which can pivot about the front axis (26), extends in the direction of the longitudinal axis (18) of the tractor, which is also contained in the vertical plane of symmetry of the shovel, as well, back to the two rear wheels (22) and laterally to a point where its side plates (30.2) are at a certain distance from the adjacent halves (10.2.1) or (10.2.2) of the rear portion of the chassis, which define a rearwardly, upwardly and downwardly open recess (32) in this rear portion.

The front portion (10.1) and the rear portion (10.2) of the chassis are hingedly connected with each other by means of the fact that on one side the left half (10.2.1) of the chassis and on the other side the right half (10.2.2) of the rear portion of the chassis form respective swivel joints (34), the pins of which align and define a folding axis (36) which perpendicularly crosses the longitudinal axis (18) of the tractor and runs horizontally approximately at the level of an upwardly facing smooth support surface (30.3) of the elevating shovel (30). This folding axis (36) lies in front of and adjacent to a forwardly rising stop surface (30.4) of the elevating shovel (30) which joins the support surface (30.3) at an angle and lies between the support surface (30.3) of the elevating shovel (30) and the engine (28).

Respective four-sided telescoping bars (38), which bridge the mentioned lateral distance are located between the side plates (30.2) of the elevating shovel on one side and the left or right halves of the rear portion (10.2) of the chassis on the other side. The fixed portions (38.1) of these telescoping bars (38) are attached to the front portion (10.1) of the chassis and extend into the recess (32) of the rear portion (10.2) of the chassis between the front wheels (14) on one side and the rear wheels (22) on the other side approximately to the rear edge (30.5) of the elevating shovel (30), where the support surface (30.3) and stop surface (30.4) thereof join. The movable portion (38.2) of each telescoping bar is axially guided and the end section (38.2.1) thereof, even when the telescoping bars (38) are at their minimum length, project rearwardly out of their associated fixed portions (38.1) to such an extent that they overlap the rear edge (30.5) of the elevating shovel. A pair of first hydraulic cylinder piston aggregates (40) are provided to activate the telescoping bars (38), which aggregates (40) lie beneath their associated telescoping bars and, like them, are arranged so as to be slightly inclined downward towards the rear relative to the horizontal. Both ends of the cylinders (40.1) of the first aggregates are connected with the fixed portions (38.1) of the telescoping bars (38). Bolts (42) are placed on the forwardly projecting ends of the piston rods (40.2) of the first aggregates, which bolts (42) extend through respective longitudinal slots formed in the smooth underside of the associated fixed portion (38.1) in one of the telescoping bars, and are mounted in the front end of the associated movable portion (38.2) of this telescoping bar.

For folding and extending the chassis (10) while raising or lowering the folding axis (36), a pair of second hydraulic cylinder piston aggregates (44) is provided, which extend approximately horizontally rearward on both sides of the tractor from the center of the engine (28) to just in front of the folding axis (36) and are hinged at the front to the front portion (10.1) of the chassis and at the back to the rear portion (10.2) of the chassis, which extends forward beyond the interrupted axis (36) to the engine (28), so that the upper second aggregates (44) engage the rear portion (10.2) of the chassis approximately over the folding axis (36), which is arranged approximately at the level of the support surface (30.3) of the elevating shovel at its front end.

The front of the recess (32) in the rear portion (10.2) of the chassis is defined by two holding arms (46) that lie lateral to the longitudinal axis (18) of the tractor, are partially rigidly connected with each other, are formed identically as roller blocks having two parallel rollers (46.1), and are mounted so as to rotate about a horizontal lateral axis (46.2) on the free ends of the piston rods (48.1) of a pair of third hydraulic cylinder-piston aggregates (48), the cylinders (48.2) of which are horizontally attached to the front portion (10.1) of the chassis at the level between the first and second aggregates (40 and 44). The holding arms (46), consequently, can be moved between a forward position above the front end of the support surface (30.4) of the elevating shovel and a rear position in front of the rear edge (30.5) of the elevating shovel.

On each of the two rear end sections (38.2.1) of the movable telescoping bar elements (38.2) there is formed an eye (50) which projects toward the plane of symmetry containing the longitudinal axis (18) of the tractor. A truncated shaft (52) is mounted on each such eye (50) in such a manner that its rotational axis perpendicularly crosses the longitudinal axis of the associated telescoping bar (38), i.e., runs approximately vertical. A pulling arm (54), in turn, in the form of a roller block having two rollers (54.1) is attached to each truncated shaft (52) and is mounted so as to rotate about an axis which perpendicularly intersects the axis of the associated truncated shaft (52), whereby each pulling arm (54) can be pivoted out of a release position parallel to the bar axis into a blocking position lateral to the longitudinal axis (18) of the tractor and back, independently of the condition of the associated telescoping bar (38). For this purpose a pair of fourth hydraulic cylinder-piston aggregates (56) is provided, which are functionally arranged between the respective pulling arms (54) and the movable portions (38.2) of the telescoping bars associated therewith. While the front end of the cylinder (56.1) of each fourth aggregate (56) is hinged to the smooth underside of the associated movable telescoping bar element (38.2), the free end of the piston rod (56.2) of the fourth aggregate projecting rearwardly approximately in the longitudinal direction of the telescoping bar (38) is hinged to a corner of an essentially triangular, flat, one-armed lever (58), which is pivotably mounted at another corner to the underside of the telescoping bar portion (38.2). At the third corner of this triangular, flat one-armed lever (58), a flat, rigid coupling member (60) is hinged to the underside of the element (38.2) of the telescoping bar, which, in turn, is hinged to this underside at the free end of a flat pivot arm (62), which is attached to the lower end of the associated truncated shaft (52). The axes of all such hinged joints, which in the given order connect the piston rod (56.2), the one-armed lever (58), the coupling member (60) and the pivot arm (62) with each other, are arranged parallel to the axis of the truncated shaft (52).

All of the hydraulic aggregates are reversible and are subjected to pressure by means of an hydraulic pump connected to the engine (28). The requisite fluid lines and control and regulating elements must be provided.

The loading and raising of the nose landing gear (not shown) of an airplane that is to be maneuvered without a tow bar takes place in the manner described below.

Beginning condition of the tractor: By maximum extension of the second aggregate (44), the chassis (10) is extended; by maximum reduction of the first aggregate (40), the two-piece telescoping bars (38) are fully extended, so that their end sections (38.2.1) are located at the rear end of the rear portion (10.2) of the chassis; by maximum extension of the third aggregate (48) the holding arms (46) are arranged at the rear end of the elevating shovel (30); and by maximum reduction of the fourth aggregate (56) the two pulling arms (54) are pivoted out of the chassis recess (32).

In this condition the tractor travels backward until each of the two holding arms (46) contacts one of the two nose wheels of the unbraked nose landing gear, which at this moment is already between the two halves of the rear portion (10.2) of the chassis in the rear half of the recess (32), which is always downwardly open. Subsequently, the still-extended chassis (10) of the stationary, not yet braked tractor is folded downward in the center by a gradual shortening of the second aggregate (44), until the support surface (30.1) of the elevating shovel contacts the tarmac (20); thus causing the wheel axes (24 and 26) to come closer together. After the placement of the elevating shovel (30) on the tarmac (20), the tractor's brakes are set, whereupon the two pulling arms (54), by maximum extension of the fourth aggregates (56), are pivoted into the chassis recess (32) as the rear closure thereof, and the first aggregates (40) are then extended until the pulling arms (54) contact the back of the nose wheels. The first aggregates (40) are then gradually extended to further shorten the telescoping bars (38) and simultaneously the third aggregates (48) are shortened to the same degree as the telescoping bars, whereby the nose wheels of the airplane on its unbraked landing gear roll forward over and past the rear edge (30.5) of the elevating shovel, while rolling against the roller blocks (46.1 and 54.1) on the support surface (30.1) to a certain holding line, where they are blocked by the aggregates (40 and 48). Then the folded chassis (10) is extended by means of a gradual extension of the second aggregate (44), whereby the elevating shovel (30) moves upward and the nose landing gear of the airplane resting on its support surface (30.1) is raised. After releasing its brakes, the tractor can then be put into motion and the airplane can be maneuvered.

To lower and unload the nose landing gear, the above-described measures are performed in the reverse order.

The claims and the abstract are components of the specification.

I claim:

1. A tractor for maneuvering an airplane without a tow bar, comprising: a chassis (10) having a central longitudinal axis (18) which chassis includes a rearwardly, upwardly and downwardly open recess (32), a rear portion (10.2) that is forked due to the recess (32) and has a pair of coaxially mounted, powered rear wheels (22) mounted on a rear axle (24), and a front portion (10.1) having two steerable and perhaps powered front wheels (14); a pair of approximately horizontal cylinders (40.1) of a pair of first hydraulic cylinder piston aggregates (40) that are arranged parallel to each other on the chassis (10) and are for adjusting the length of two telescoping bars (38) each having a fixed portion (38.1) and a movable portion (38.2) which bars are adjustable parallel to the respective side walls (10.2.1) and (10.2.2) of the recess (32) and are each provided at their free rear ends (38.2.1) with a hinged pulling arm (54), which can pivot through a right angle between a relatively open position relative to the free end (38.2.1) of the bar parallel to the axis of the bar (38) and a relatively closed blocking position perpendicular to the axis of the tractor about a vertical axis which perpendicularly intersects the associated bar axis (of 38); a support surface (30.3) which is arranged on the chassis (10) at the front end of its recess (38) and is inclined downward toward the rear to allow for the elevation of the nose landing gear when the pulling arms (54) and shortened telescoping bars (38) are in their blocking positions; and an elevating device including a pair of second hydraulic cylinder-piston aggregates (44) arranged on the chassis (10) for lifting the nose landing gear after it has been placed adjacent to and on the support surface (30.3) and locked in place thereby means of the pulling arms moving into their blocking positions, wherein the front and rear portions (10.1 and 10.2) of the chassis (10) are distinct units and are connected with each other in an articulated manner by means of a single folding axis (36) running parallel to the rear axle (24); the second aggregates (44) arranged approximately horizontal parallel to the tractor axis (18) are hinged at one end to the front portion (10.2) of the chassis (10) and at the other end to the rear portion (10.2) thereof; the cylinders (40.1) of the first aggregates (40) and the fixed portions (38.1) of the telescoping bars (38) are mounted to the front portion (10.1) of the chassis (10) and an elevating shovel (30) having the support surface (30.3) is attached to this front portion (10.1) behind the folding axis (36); and a pair of approximately horizontal cylinders (48.2) of a third cylinder-piston aggregate (48) is provided arranged on the front portion (10.1) of the chassis (10), the piston rods (48.1) of which are arranged adjustably on the respective two sides (10.2.1 and 10.2.2) of the recess (32) in the chassis (10) and are provided at their free rear ends with at least one holder (46) which is hinged perpendicularly to the tractor axis (18) and always projects into the recess (32) in the chassis (10).

2. Tractor according to claim 1, wherein the folding axis (36) is arranged approximately at the level of the support surface (30.3) of the elevating shovel (30) near the front end thereof, and the second aggregate (44) engages approximately above the folding axis (36) with the rear portion (10.2) of the chassis (10).

3. Tractor according to claim 1, wherein the telescoping bars (38) and the first aggregates which adjust them are inclined from the horizontal (18) so as to be downwardly inclined toward the rear.

4. Tractor according to claim 1, wherein the cylinders (40.1) of the first aggregates (40) and the fixed portions (38.1) of the telescoping bars (38) are arranged in pairs adjacent to one another in such a manner that one cylinder (40.1) and one fixed rear portion (38.1) of the telescoping bars (38) are arranged on each side in the recess (32) in the chassis (10) at points that are approximately diametrically opposite each other relative to the tractor axis (18), and in that the one-sided piston rods (40.2) of the first aggregates (40), which project forward out of the associated cylinders (40.1), engage at the front ends of the movable front portions (38.2) of the telescoping bars (38).

5. Tractor according to claim 1, wherein for the mounting of the pulling arms (54), respective truncated shafts (52) are provided on the free ends (38.2.1) of the movable end portions of the telescoping bars (3), which truncated shafts extend along the pivot axis of the associated pulling arm (54) and are rotatably mounted on the end of the associated telescoping bar (38.2.1), and for the pivoting of the pulling arms (54), respective pivot arms (62) connected with the associated truncated shaft (52) so as to rotate therewith and cylinders (56.1) of a pair of fourth hydraulic cylinder-piston aggregates (56) mounted on the associated movable portion of the telescoping bar (38.2) are provided, the piston rods (56.2) of which cylinders (56.1) project rearwardly out of said cylinders (56.1) and are hingedly coupled with the end of the associated pivot arm (62) opposite the respective truncated shafts.

6. Tractor according to claim 5, wherein each fourth aggregate (56) is arranged on the movable end portion (38.2) of an associated telescoping bar (38) approximately parallel to the other fourth aggregate, and the front end of its cylinder (56.1) is hinged there, and its piston rod (56.2) is hingedly connected to a triangular one-armed lever (58), one end of which is pivotably mounted on the end portion (38.2.1) of the telescoping bar, at a point lying closer to the pivot axis of the lever (58); and in that one end of a rigid coupling member (60) is hinged to the other end of the lever (58) at a point lying further away from its pixot axis, and the other end of the coupling member (60) is hinged to the free end of the associated pivot arm (62), whereby all hinge axes are parallel to each other and to the pivot axes of the associated pulling arms (54), as well as being approximately vertical.

7. Tractor according to claim 1, wherein the pulling arms (54) and holders (46) are each formed as roller blocks which are mounted on the associated truncated shafts (52) and on the respective free rear ends of the piston rods (48.1) of the associated third aggregate (48), respectively, in such a manner as to be able to freely rotate on their axes (54.2 , 46.2), which may be permanently or only sometimes horizontal.

8. Tractor according to claim 1, wherein the holders are formed as holding arms (46) and are partially rigidly connected with each other laterally with respect to the tractor axis (18).

* * * * *